United States Patent [19]

Labus

[11] 3,963,390
[45] June 15, 1976

[54] BEARING ARRANGEMENT FOR ROTARY PISTON ENGINE FOR COMPRESSING AND EXPANDING GASES

[75] Inventor: Herwig Labus, Juelich, Germany

[73] Assignee: Kernforschungsanlage Jüelich Gesellschaft mit beschräenkfer Haftung, Juelich, Germany

[22] Filed: Dec. 19, 1974

[21] Appl. No.: 534,418

[30] Foreign Application Priority Data
Dec. 19, 1973 Germany............................ 2363066

[52] U.S. Cl.............................. 418/188; 418/206; 308/201; 308/217
[51] Int. Cl.².................... F04C 17/10; F16C 33/38; F16C 33/46
[58] Field of Search.................... 418/188, 201, 206; 308/201, 217

[56] References Cited
UNITED STATES PATENTS

| | | | |
|---|---|---|---|
| 2,225,908 | 12/1940 | Garthe | 418/206 |
| 2,724,340 | 11/1955 | Tryhorn | 418/206 X |
| 3,038,767 | 6/1962 | Greby | 308/217 |

FOREIGN PATENTS OR APPLICATIONS

| | | | |
|---|---|---|---|
| 1,166,442 | 11/1958 | France | 308/217 |
| 900,881 | 7/1962 | United Kingdom | 418/206 |

*Primary Examiner*—C. J. Husar
*Assistant Examiner*—Leonard Smith
*Attorney, Agent, or Firm*—Walter Becker

[57] ABSTRACT

A bearing arrangement advantageous for rotary piston engine for compressing or expanding gases, which comprises a housing formed of two cylindrical partial cups of two equal sized hollow bodies, said cups facing each other along longitudinal openings. In said housing there are provided two shafts of equal pitch diameter, which shafts are rotatable about the central axis of one of said two hollow bodies and mesh with each other. Between each one of the shafts and the inner surface of the hollow body surrounding the pertaining shaft there is formed a working chamber intended for an diabatic inner compression or expansion of the gases. The shafts respectively comprise a rotary piston extending over the length of the hollow body. The shafts also have a recess adjacent said rotary piston and extending in an axis-parallel manner while said recess has a dimension making possible the meshing of the rotary piston of the other shaft. The two shafts are connected to two control gears which are rotatable about the central axis of said shafts outside the housing and mesh with each other.

5 Claims, 3 Drawing Figures

BEARING ARRANGEMENT FOR ROTARY PISTON ENGINE FOR COMPRESSING AND EXPANDING GASES

The present invention relates to a rotary piston engine for compressing or expanding gases, which comprises a housing formed of two cylindrical partial cups of two equal sized hollow bodies, said cups facing each other along longitudinal openings. In said housing, there are provided two shafts of equal pitch diameter, which shafts are rotatable about the central axis of one of said two hollow bodies and mesh with a fine-toothed labyrinth with each other. Between each one of the shafts and the inner surface of the hollow boby surrounding the pertaining shaft there is formed a working chamber intended for an adiabatic inner compression or expansion of the gases. The said shafts respectively comprise a rotary piston extending over the length of the hollow body and extending with slight play to the inner wall of the hollow body and forming with the respective engaging parts of the inner wall of the hollow body a surface forming a gap or labyrinth gap seal. The said shafts also have a recess adjacent said rotary piston and extending in an axis-parallel manner while said recess has a dimension making possible the meshing of the rotary piston of the other shaft, while the two shafts are connected to two control gears which are rotatable about the central axis of said shafts outside the housing and mesh with each other.

Engines for compressing or expanding gases are frequently used in the industry. According to one not heretofore known rotary engine of the above mentioned general type with sealing gaps not touching each other, one of the shafts is designed as hollow shaft while the recess of the shaft designed as hollow shaft has such a depth that in that shaft which is designed as hollow shaft, a slot is formed which extends parallel to the axis of the shaft, and while the shaft designed as hollow shaft is rotatable about an inner hollow cylinder slit open over the length of said slot. The inner cylinder serves as discharge or intake conduit, and the opening in the housing correspondingly serves as intake or outlet opening for the gases. This rotary piston engine is according to the above mentioned suggestion inserted in an internal combustion engine operated as a hot air engine. In this internal combustion engine, one or more compression engines and a compression chamber adapted to be charged with burnable substances in a continuous manner and at a constant pressure, has a volume of a size which is sufficient for a longer staying time of the combustible substances. Futhermore, there are provided one or more expansion engines which follow the combustion chamber but are spatially separated from each other and are connected to each other by connecting lines. Between the compression engine or engines and the combustion chamber there is provided a heat exchanger which is passed through by the gases compressed in the compression engine or engines and in counterflow to the compressed gases is passed through by the exhaust gases of the expansion engine or engines. The rotary piston engine is operated as a compression or expansion engine with a pressure ratio of the gases of approximately from 2.0 to 5.0.

When employing the rotary piston engine according to the above mentioned suggestion, the internal combustion engine will have an economical operation, particularly when the rotary piston engine employed as compression and/or expansion engine is operated at high speeds. In the case it can be realized that the gas losses through the gaps are lower than with slow rotating rotary piston engines. Moreover, the internal combustion engine will, when employing high speed rotary piston engines, have a relatively small magnitude and thus will have also a low weight. In order to keep the gas losses in permissible limits, rotary speeds of the rotary piston engine of approximately from 20,000 to at least 25,000 revolutions per minute are necessary.

It is, therefore, an object of the present invention to provide a rotary piston engine for compressing and expanding gases, in which the movable parts are so mounted that rotary speeds up to approximately 36,000 revolutions per minute will be possible while the bearings can be loaded up to approximately 90 kp.

These and other objects and advantages of the invention will appear more clearly from the following specification, in connection with the accompanying drawings, in which.

Figure 1:
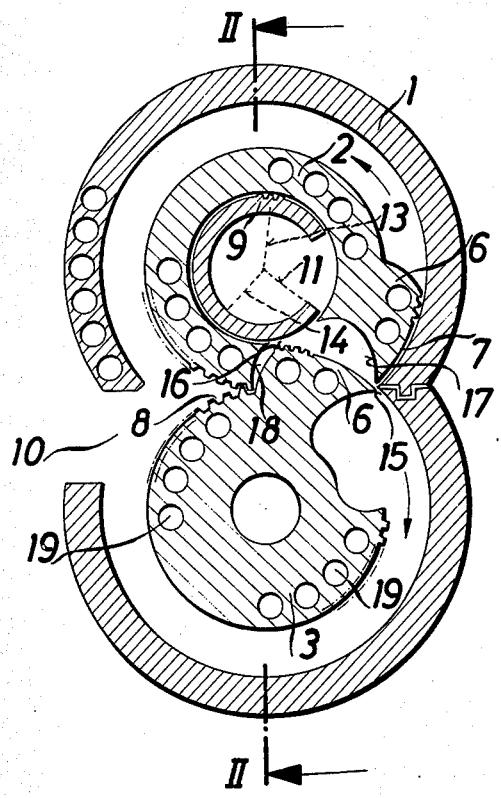
FIG. 1 illustrates a section through the rotary piston engine according to the invention, said section being taken along the line I—I of FIG. 2.

The above mentioned object has been realized with a rotary piston engine of the type mentioned in the introductory portion to the specification by designing one of the shafts as a hollow shaft while the recess of the shaft designed as hollow shaft has such a depth that in the shaft designed as hollow shaft there is formed a slot which is parallel to the axis, and by rotatably journaling the shaft designed as hollow shaft for rotation about a hollow inner cylinder slit open over the length of the slot. The inner cylinder is designed as outlet or inlet conduit, and an opening in the housing serves correspondingly as inlet or outlet opening for the gases. The arrangement according to the invention is furthermore characterized in that for purposes of mounting the shafts there are provided radial bearings, which radial bearings comprise an outer ring, an intermediate ring rotatably arranged within said outer ring, recesses for guiding a plurality of antifriction bodies and an inner ring rotatably arranged within said intermediate ring. The surfaces of the intermediate ring facing the inner and outer ring comprise wedge surfaces which are so arranged between said recesses that in view of the thus designed wedge-shaped gaps a hydrodynamic lubrication is effected. These gaps comprise between the surfaces of the intermediate ring and the surfaces of the outer and inner ring facing the intermediate ring a lubricant such as oil, or the like, while said gaps are located opposite to each other. The intermediate ring has expediently from four to eight recesses for the antifriction bodies.

Due to the arrangement of the antifriction in the intermediate ring, it is realized in an advantageous manner that at low speeds the forces occurring during the rotation are absorbed by the antifriction body, while the bearing is centered and the wedge gap surfaces are protected against running dry. When the bearing rotates at high speeds, at which with a bearing diameter of, for instance, 80 mm. moving speeds of approximately 100 meters per second are realized, the centering of the bearing is effected by a hydrodynamic lubrication which is brought about by wedge gaps. In this connection, the wedge gap surfaces take over the power distribution. In this connection, it is advantageous that due to the tangential forces which occur in view of the inner liquid friction in the lubricant in the wedge gap, the intermediate ring is rotated with the antifriction bodies. With a suitable design of the wedge gap surfaces, it will be realized that the intermediate ring reaches has the speed of the inner ring so that the sliding speed in the radial bearing of the rotary piston engine according to the invention is only half as high as with heretofore known sliding bearings. As a result thereof, with the same cooling system, twice as high speeds can be obtained. The antifriction bearings are expediently designed as balls so that they will offer the lubricant in the sliding condition of the bearing only slight resistance.

A very advantageous design of the rotary engine according to the invention consists in that the rotary pistons and the recesses are so designed that the surfaces of the rotary pistons forming with parts of the inner wall of the hollow bodies gap or labyrinth gap seals have a magnitude corresponding at least to the cross-sectional surface of the foot of the rotary piston and that the rotary piston and recesses are so shaped that when the rotary piston of one shaft meshes with the recess of the other shaft, the respective two surface edges which extend parallel to the central axes of the shafts are with slight play and at constant distance guided along one flank each of the recess of the other shaft. Due to the fact that that surface of the rotary piston which engages the inner wall of the hollow body is as great as possible, it will be realized that also the gap length is as large as possible whereby an excellent seal of the pistons relative to the inner wall of the hollow body is obtained also without oil lubrication. Furthermore, due to the fact that the rotary pistons and the flanks of the recess are so designed that the surface edges nearly reach the flanks of the recesses at constant distance, the dead space volume will be kept as small as possible. In this connection, due to the external control of the two shafts, it is not necessary to maintain a high degree of precision manufacturing. It is rather sufficient that the distance amounts to from 1 to 2 mm.

A further very advantageous design of the rotary piston engine according to the invention consists in that for purposes of stabilizing the shaft which is rotatable about the inner cylinder, a plate and a ring are connected to the shaft at the end face side. Furthermore, it has proved expedient to make the shafts longer than their diameter by a factor from 2 to 3. As a result thereof, with the same volume of the working chamber, the flow losses of the gases are kept to a minimum and it will be obtained that the centrifugal forces, even at high speeds of revolution of the shafts are kept in technically admissible limits.

Figure 2:
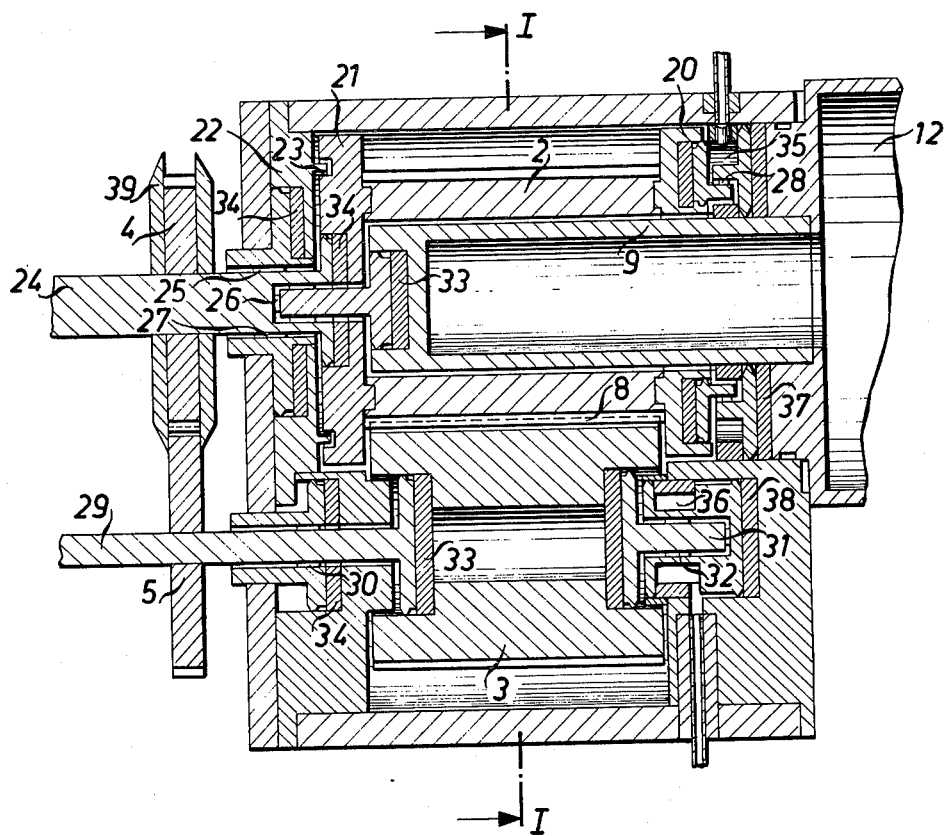
FIG. 2 is a section taken along the line II—II of FIG. 1.

Referring now to the drawings in detail, it will be evident from FIG. 1 that the rotary piston engine comprises a housing 1 which includes two cylindrical hollow bodies having the shape of two cylindrical semi-cups facing each other along the longitudinal openings. Rotatably journaled about the central axis of said cylindrical hollow bodies are two shafts 2 and 3 with the same pitch circle. These two shafts, as will be evident from FIG. 2 are connected to control gears 4 and 5 which mesh with each other and are rotatably journaled outside the housing 1. The said shafts 2 and 3 respectively comprise a rotary piston 6 which extends over the length of the respective hollow body and has a recess adjacent the rotary piston 6. That surface of the rotary piston 6 which faces the inner wall of housing 1 forms, as is illustrated in the upper portion of FIG. 1, with the respective engaging partial surface of the inner wall of housing 1 a gap or labyrinth gap seal 7. The two shafts 2 and 3 furthermore comprise a fine tooth labyrinth 8. As will be evident from FIG. 1, the shaft 2 is perforated at its foot and is journaled for rotation about a hollow inner cylinder 9 which is slit open along the length of the shaft. As will likewise be evident from FIG. 1, the hollow body surrounding shaft 3 has at the confining surface of the two hollow bodies an opening 10 which when the engine operates as expansion engine serves as discharge opening, and when the engine operates as compression engine serves as inlet opening for the gases.

FIG. 1 shows the two rotary pistons 6 occupying a position at the inlet angle 11 in which position the pistons define the minimum dead chamber. In the direction of rotation of the shafts 2 and 3, as it is indicated by the arrows, the engine is employed as expansion engine. The gases which have from the combustion chamber 12, partially illustrated in FIG. 2, passed into the hollow inner cylinder 9, will during the further rotation of shafts 2 and 3, due to the fact that the slot in shaft 2 designed as hollow shaft overlaps the slot in the inner cylinder 9, flow in an isobaric manner into the working chamber being formed until after a further rotation of shafts 2 and 3 and when the filling angle 13 has been reached, the inflow of the gases into the working chamber is interupted. In the working chamber the gas now has the pressure and temperature prevailing in the combustion chamber. During a further rotation of shafts 2 and 3, the gas in the working chamber is expanded in an adiabatic manner until the outer angle 14 has been reached. From here the rotary pistons 6 mesh with each other free from forces until the starting point at the inlet angle 11 has again been reached. During the following rotation the expanded gas is exhausted through the outlet opening 10. At the same time, gas begins again to flow from the inner cylinder 9 into the working chamber being formed.

When using the engine as compression engine, the shafts 2 and 3 are turned in a direction opposite to the direction indicated by the arrows in FIG. 1. The gases then enter through the inlet opening 10, are compressed in the working chamber due to the rotation of shafts 2 and 3, and then, as soon as the perforated foot of the recess in shaft 2 overlaps the slot of the inner cylinder 9, are pushed into the inner chamber of the inner cylinder 9 from where they pass into the combustion chamber.

As will be evident from FIG. 1, the rotary pistons are so designed that the surfaces of the rotary pistons 6 which form the gap seal are as large as possible. The flanks of the recesses ae so shaped that, as indicated for instance by the illustration of the lower rotary pistons 6 in FIG. 1, during the meshing of the rotary pistons 6 with each other, the surface edge 15 passes by the flank 17 of the recess in shaft 2, and the surface edge 16 passes by the flank 18 of the recess of shaft 2 at constant distance.

In order that the housing 1 as well as shafts 2 and 3 as quickly as possible assume the mean temperature of the exhaust gases, and in order to reduce the weight of the engine, bores 19 are provided. These bores are at the same time in shafts 2 and 3 so arranged that the unbalances created by the rotaty pistons 6 and said recesses will be compensated for.

As will be evident from FIG. 2, for purposes of shaft stabilization the axial spaced locations, a ring 20 and a plate 21 at the end faces thereof are fixedly connected to shaft 2. Plate 21 is sealed against the cover plate 22 of the housing by means of a labyrinth 23. On that side which faces the control gears 4 and 5, the shaft 2 is journaled in the bearings 25 and 26 through the axle 24 fixedly connected to plate 21, at one side thereof but no axle 24 is provided with ring 20. The axle 24 at the same time surrounds the pivot 27 which is fixedly connected to the inner cylinder 9. Shaft 2 is journaled in bearing 28 on that side which faces the combustion chamber 12. On that side which faces the control gears 4 and 5, the Shaft 3 is journaled in bearing 30 through the intervention of the axle 29 fixedly connected to shaft 3, and on that side which faces the combustion chamber is journaled in bearing 32 through the intervention of a pivot 31 fixedly connected to shaft 3.

For purposes of heat insulating the bearings, the discs 33 and rings 34 are provided. The bearings 28 and 32 arranged on that side which faces the combustion chamber 12 are embedded in annular hollow spaces 35 and 36 through which a cooling fluid is pumped through feed lines through the housing wall. When sufficient heat insulation is provided, a simple air cooling will do. In order to avoid that housing 1 heats up to the temperature in the combustion chamber 12, rings 37 and discs 38 are provided for heat insulation. In this way, it will be obtained that housing 1 will have the considerably lower mean temperature of the expanded gases.

For purposes of axially positioning shafts 2 and 3, guiding discs 39 are provided on the external control gear 4.

Figure 3:
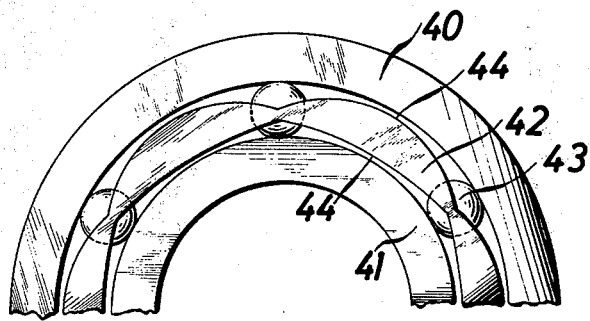
FIG. 3 is a partial cross section through a radial bearing employed as bearing for the shafts.

As will be evident from FIG. 3, detail for bearing 28 in FIG. 2 is shown to include the radial bearing for shafts 2 and 3 comprising an outer ring 40, an inner ring 41, and an intermediate ring 42 located between said outer ring and said inner ring. As will furthermore be evident from the drawing, the intermediate ring 42 has a plurality of antifriction bodies 43 which are guided in recesses in the intermediate ring. Those surfaces of the intermediate ring which face the outer and inner ring are so designed that wedge gaps 44 are formed between the intermediate ring and the two other rings.

It is, of course, to be understood that the present invention is, by no means, limited to the specific showing in the drawings, but also comprises any modifications within the scope of the appended claims.

What I claim is:

1. A bearing combination for a rotary piston engine for compressing or expanding gases and comprising; intersecting partial cups on parallel adjacent axes forming a housing, said cups being open near one region of intersection thereof, a rotary piston in each cup, said pistons having meshing labyrinth seal means and each having a radial projection which runs closely inside the pertaining cup, each piston having a pocket to receive the projection on the other piston, said projections being in side by side relation when disposed in said pockets, a hollow shaft coaxial with one piston and opening outside the housing at one end and having an axial slot, the pocket in said one piston having a port which communicates with said slot in one rotated position of said one piston, means for driving the pistons in rotation in unison in respective directions, and radial bearing means providing radial support for said pistons in the housing, each bearing means comprising inner and outer race rings and rolling bodies between said race rings and an intermediate ring between the inner and outer race rings and having recesses in which said rolling bodies are disposed, the sides of said intermediate ring which faces said outer and inner race rings comprising wedge regions which taper outwardly in both peripheral directions from near the axial planes of said rolling bodies and which approach said race rings intermediate said rolling bodies, lubricant introduced between said rings creating hydrodynamic lubricating conditions when said rings rotate relatively.

2. A rotary bearing combination for a rotary piston engine according to claim 1 in which said intermediate ring has from four to eight recesses therein for receiving rolling bodies.

3. A bearing combination for a rotary piston engine according to claim 1 in which said projections at the radially outer ends comprise means for effectively sealing against the inner walls of said cups, said projections and pockets being so formed that the radially outer edges of said projections which are parallel to the axes of the pistons will move along the end walls of the pockets with not more than slight clearance thereform.

4. A bearing combination for a rotary piston engine according to claim 1 in which said one piston which is coaxial with said hollow shaft has a ring connected to one end and a plate connected to the other end, said ring and plate imparting stability to said one piston.

5. A bearing combination for a rotary piston engine according to claim 1 in which each said piston has a length of from 2 to 3 times the diameter thereof.

* * * * *

UNITED STATES PATENT OFFICE
CERTIFICATE OF CORRECTION

Patent No. 3,963,390          Dated June 15, 1976

Inventor(s) Herwig Labus

It is certified that error appears in the above-identified patent and that said Letters Patent are hereby corrected as shown below:

On the Title page,

Item [75] Inventor: Herwig Labus, Juelich, Germany should read:

-- [75] Inventor: Herwig Labus, Jülich, Germany --.

Item [73] Assignee: Kernforschungsanlage Juelich Gesellschaft mit beschraenkfer Haftung, Juelich, Germany should read:

-- [73] Assignee: Kernforschungsanlage Julich Gesellschaft mit beschrankter Haftung, Jülich, Germany --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*